United States Patent [19]

Urushihara et al.

[11] 4,452,418
[45] Jun. 5, 1984

[54] MOUNTING STRUCTURE FOR COMPRESSOR FOR CAR COOLER

[75] Inventors: Koji Urushihara; Yoshihito Okada; Haruyuki Komori, all of Narashino, Japan

[73] Assignee: Seiko Seiki Kabushiki Kaisha, Chiba, Japan

[21] Appl. No.: 295,012

[22] Filed: Aug. 21, 1981

[30] Foreign Application Priority Data

Sep. 12, 1980 [JP] Japan .................. 55-130190[U]

[51] Int. Cl.³ .............................................. F16M 1/00
[52] U.S. Cl. .................................... 248/666; 248/652
[58] Field of Search ............... 248/666, 652, 665, 664; 474/113, 115, 117, 114

[56] References Cited

U.S. PATENT DOCUMENTS

| | | | |
|---|---|---|---|
| 1,273,170 | 7/1918 | Fisher | 474/114 X |
| 1,357,741 | 11/1920 | Stevens | 474/114 X |
| 1,507,238 | 9/1924 | Kocourek | 474/113 |
| 1,832,958 | 11/1931 | Bachle | 474/177 X |
| 1,869,888 | 8/1932 | Dina | 248/652 |
| 3,274,841 | 9/1966 | Roberts | 248/666 X |
| 3,430,507 | 3/1969 | Hurst et al. | 474/113 |
| 3,922,927 | 12/1975 | Shiki | 474/113 |

FOREIGN PATENT DOCUMENTS 410137 2/1925 Fed. Rep. of Germany ...... 474/114

*Primary Examiner*—J. Franklin Foss
*Attorney, Agent, or Firm*—Robert E. Burns; Emmanuel J. Lobato; Bruce L. Adams

[57] ABSTRACT

A mounting mechanism for mounting a compressor in an engine compartment of a car comprises at least two plate members fixed to and projecting outwardly of the compressor at circumferentially spaced locations thereof, and at least two mount stay members fixed in the engine compartment and extending towards the compressor so as to lie in superposed face-to-face relationship with respective ones of the plate members. A bolt extends through one pair of superposed plate and mount members so as to pivotally mount the compressor for pivotal turning movement about the bolt to thereby enable adjustment of the position of the compressor. An elongate slot is formed in either the plate member or mount member of another pair of superposed plate and mount and the inner surface of the slot is provided with a toothed surface. A locking member is disposed within the slot and connected to the other of the plate and mount members so as to engage with the toothed surface of the slot to thereby releasably lock together the other pair of plate and mount members to lock the compressor in its adjusted position. The locking member may comprise a click member turnably mounted on a bolt extending into the elongate slot, or a spring member mounted on a bolt extending into the elongate slot, or a toothed stopper member connected to a bolt extending into the elongate slot. The position of the compressor can be adjusted by disengaging the locking member from the toothed surface of the slot and thereafter pivotally turning the compressor about the bolt and then engaging the locking member with the toothed surface so as to releasably lock the compressor in its adjusted position.

12 Claims, 17 Drawing Figures

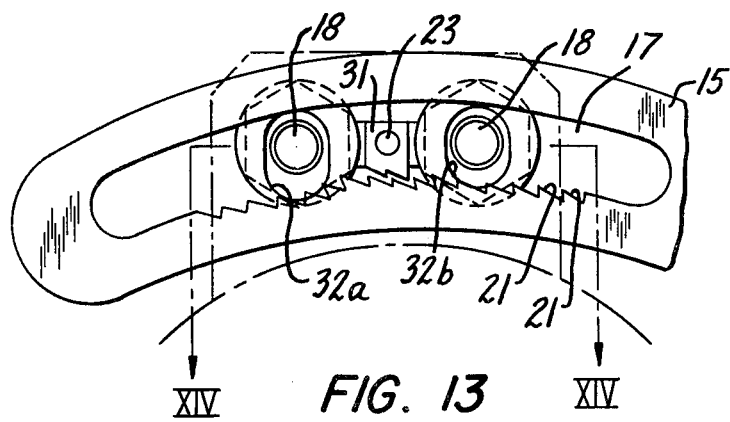
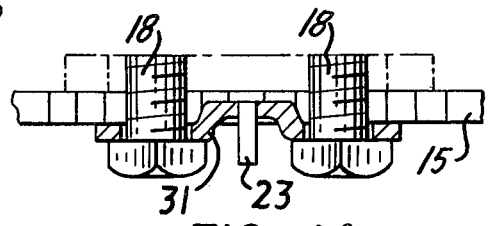
FIG. 13    FIG. 14
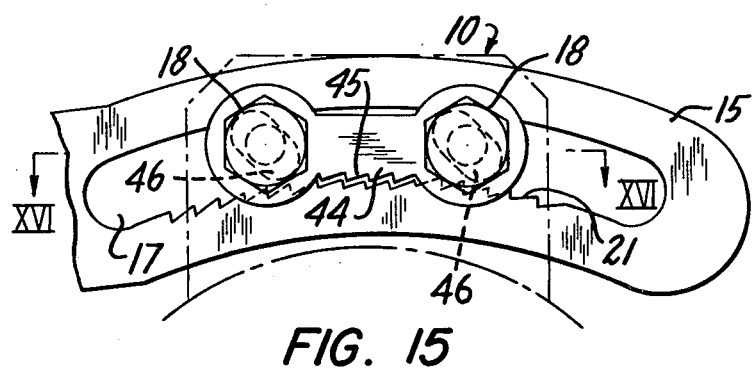
FIG. 15
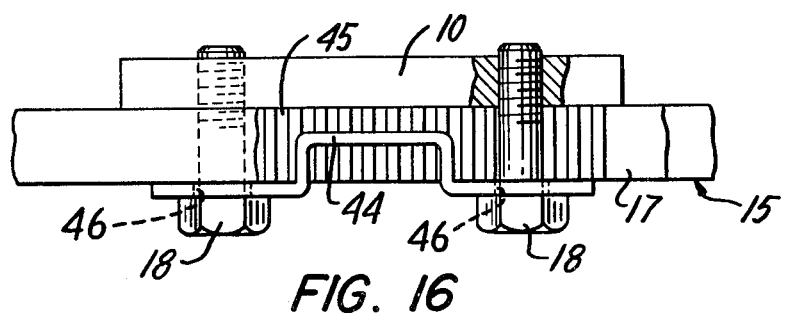
FIG. 16
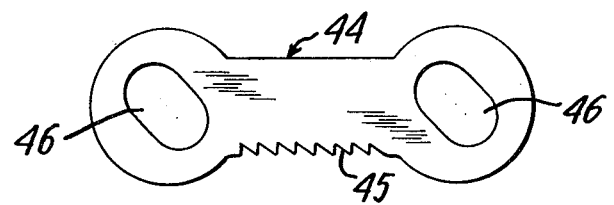
FIG. 17

MOUNTING STRUCTURE FOR COMPRESSOR FOR CAR COOLER

BACKGROUND OF THE INVENTION

The present invention relates to a mounting mechanism for a compressor for a car cooler.

The compressor for compressing the refrigerant gas for a car cooler is driven by the car engine by way of a V-belt as known. In such a case, it is necessary to apply an appropriate tension to the V-belt and at the same time to adjust the extension of the V-belt with the passage of time. The conventional mounting structure for a compressor is shown in FIG. 1, in which a V-belt 4 is wound around a pulley 2 on the engine and a pulley 3 on the driving shaft of the compressor by way of a tension pulley 1. Since the tension pulley 1 is vertically movable, the tension on the V-belt is adjusted by shifting the pulley 1 to the position where a suitable tension is given to the V-belt 4.

However, this structure is exceedingly inconvenient, since the tension pulley 1 and the V-belt 4 occupy an unnecessarily large space in the engine compartment, so that the cost is high and adjustment of the V-belt tension is difficult.

The present invention aims to eliminate the above-noted drawbacks, and therefore it is an object of the present invention to provide a mounting mechanism to enable adjustment of the position of the compressor by pivoting the compressor around one bolt, whereby the appropriate tension of the V-belt is obtained without the tension pulley.

BRIEF DESCRIPTION OF THE DRAWINGS

FIGS. 13-14 show a front view and a side view of another embodiment, in which the engaging force of the stopper member is enforced, and FIGS. 15-17 show a front view, a side view and a detailed view of the stopper member, in which the engaging force of the stopper member is enforced.

Hereinafter the present invention will be described in conjunction with the drawings.

Figure 1:
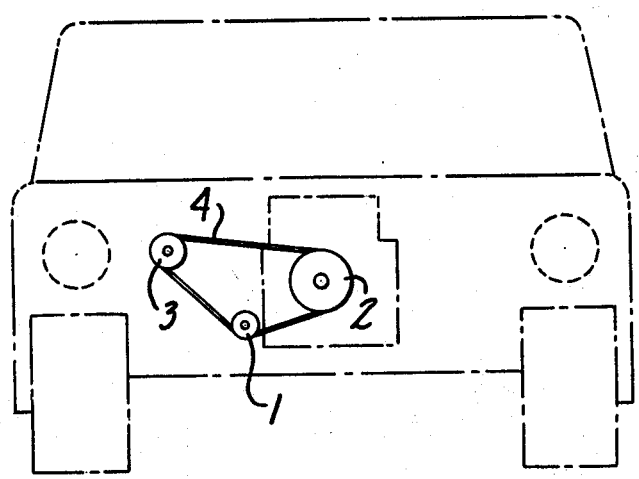
FIG. 1 shows an explanatory diagram of the conventional mounting structure for a compressor.
Figure 2:
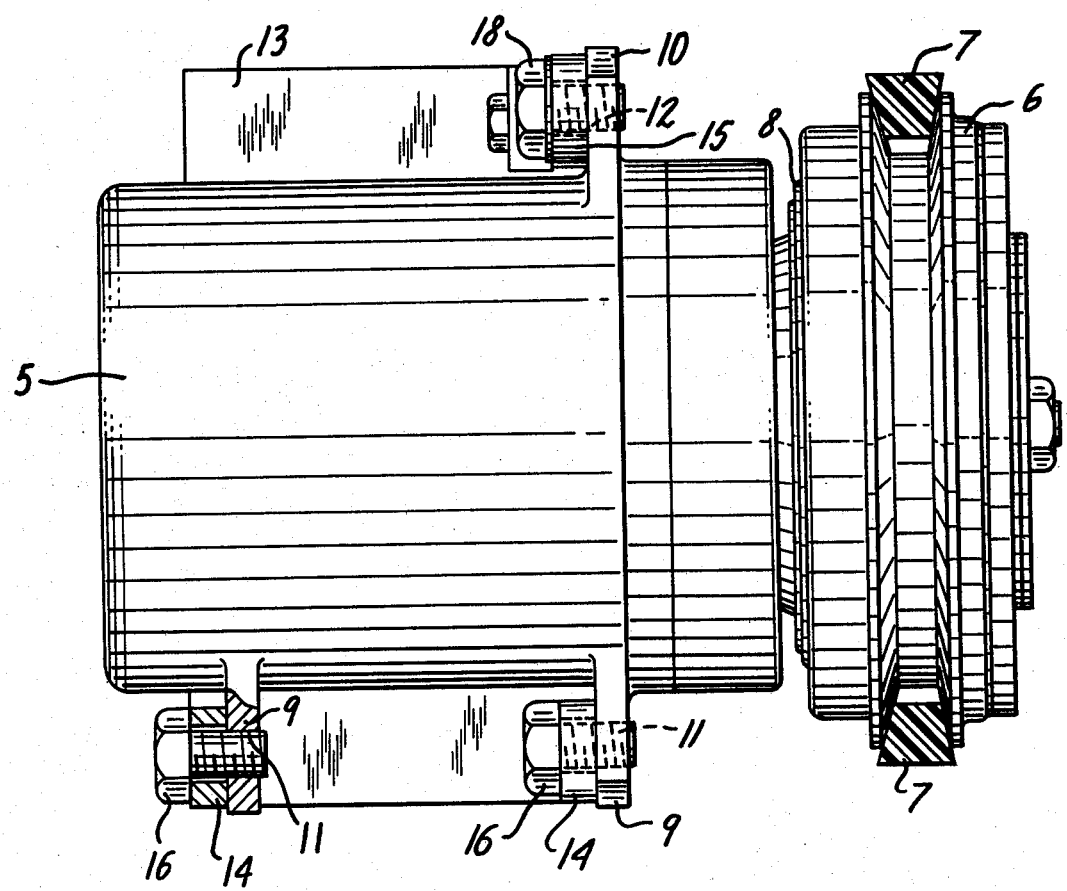
FIG. 2 shows a side view of the mounting structure for a compressor according to the present invention.
Figure 3:
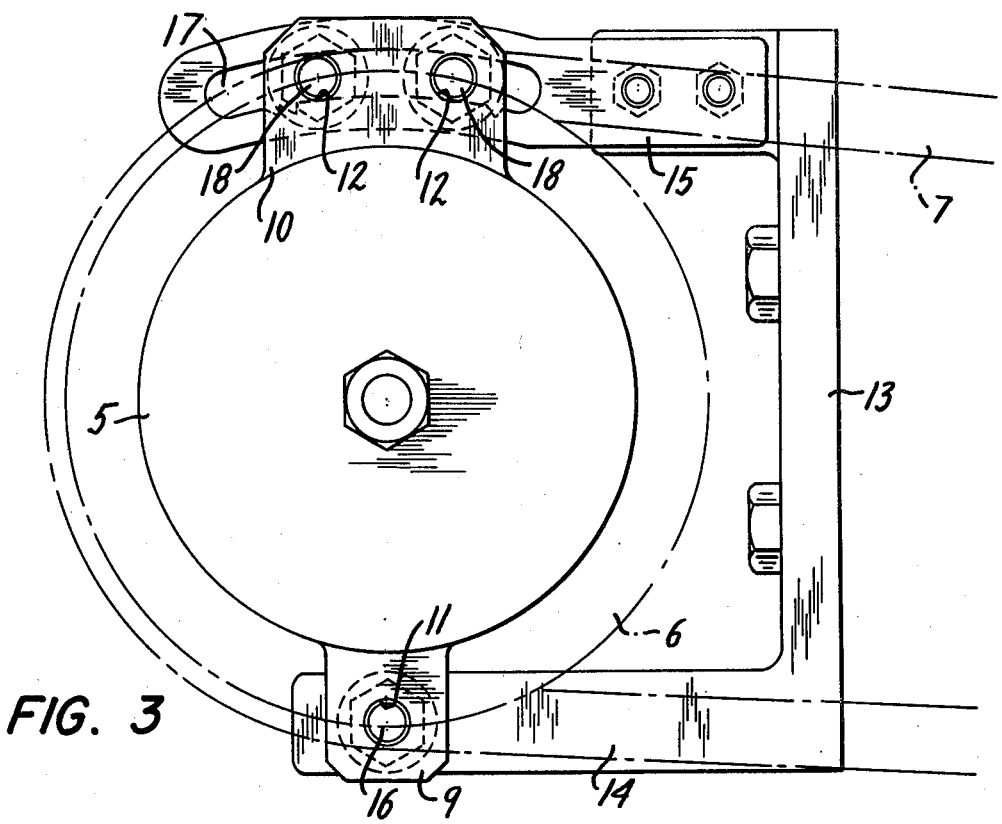
FIG. 3 shows a front view of the same.

In FIGS. 2 and 3, reference numeral 5 denotes a rotary compressor of the vane type which is cylindrical in shape and centered around the driving shaft. Reference numeral 6 denotes a pulley mounted concentrically on the driving shaft. A V-belt 7 is wound around the pulley 6 and the engine pulley (not shown) to be constantly rotated when the engine is operating. The driving shaft of the compressor 5 is driven by exciting an electromagnetic clutch 8. Reference numerals 9, 9 and 10 are fixed plates mounted in one body with a casing to project from the outer periphery of the compressor 5. The fixed plates 9, 9 are respectively provided with aligned screw holes 11, 11 on the same axis which extends parallel to the driving shaft. The fixed plate 10 is located diametrically opposite the fixed plates 9, 9 and provided with screw holes 12, 12.

Reference numeral 13 denotes a mount member fixed to mount stay members 14, 14 which are attachable to the fixed plates 9, 9 and a mount stay member 15 which is attachable to the fixed plate 10. The mount member 13, the mount stay members 14, 14 and the mount stay member 15 are in the configuration of "]" and have the compressor interposed therebetween in the lateral direction. The mount stay members 14, 14 are provided with round holes at the tips thereof, through which the fixed plates 9, 9 are screwed by bolts 16, 16. The mount stay 15 is provided with an elliptic slotted hole 17 of arch shape slightly longer than the distance between the screw holes 12 and 12, through which the fixed plate 10 is screwed by bolts 18, 18.

By such a construction, the compressor 5 can be pivoted towards and away from the engine centering around the bolts 16, 16, and the tension of the V-belt 7 can be easily adjusted by screwing the bolts 16, 18 at the position where the tension is appropriate.

While the elliptic hole 17 is provided on the mount stay member 15 which is secured by the bolts 18, 18 screwed on the fixed plate 10, it is to be noted that the same effect can be obtained when the fixed plate 10 is provided with the elliptic hole and the bolts are fixed to the mount stay member 15.

In the next embodiment, the compressor pivots in the direction to extend the belt but does not pivot in the reverse direction to slacken the belt, whereby the user can devote himself to extend the tension of the V-belt, and screw the bolts after affirming the tension.

Figure 4:
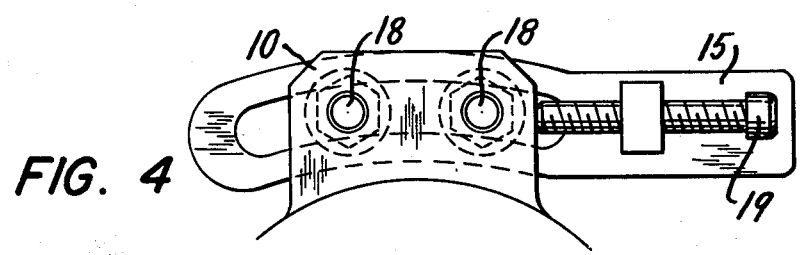
FIG. 4 shows a partial detailed view of another embodiment, in which the position of the compressor is adjusted by the use of an adjusting screw.

FIG. 4 shows an embodiment of this invention in which an adjusting screw 19 which moves in the lengthwise direction is provided at the base of the mount stay member 15 to adjust the position of the fixed plate 10 relative to the mount stay member 15 in response to lengthwise displacement of the screw 19 which contacts the side surface of the plate 10.

Figure 5:
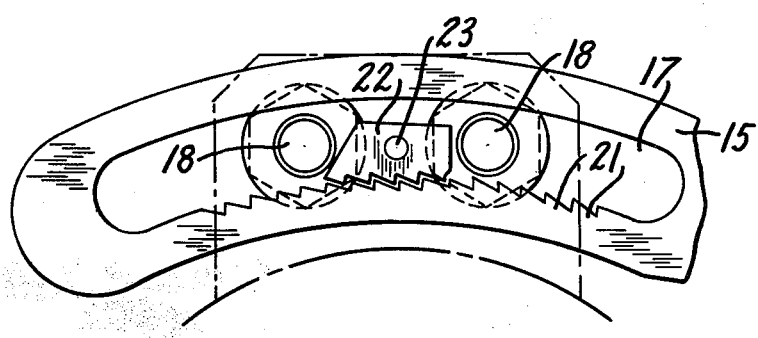
FIG. 5 shows a partial detailed view of another embodiment, in which the position of the compressor is adjusted by the use of a stopper.

FIG. 5 shows another embodiment of this invention in which a saw-tooth surface 21 is provided at a lower inner periphery of the elliptic hole 17 formed on the mount stay member 15. The toothed surface 21 engages with a locking member in the form of a stopper member 22 enclosed in the elliptic hole between the bolts 18 and 18 to adjust the position of the fixed plate 10. Both ends of the stopper member 22 may be straight but it is preferable that one end of the stopper member has a sloped surface to obtain a firm engagement. Further an elastic member (not shown) such as a plate spring may be inserted between an upper inner periphery of the elliptic hole 17 and the stopper member 22 to obtain a positive engaging force, if necessary. Reference numeral 23 denotes a pin projecting outwardly of the stopper member 22 for releasing the engagement thereof with the toothed surface 21. Although the stopper member 22 is provided with a plurality of teeth in FIG. 5, it may be provided with only one tooth.

Figure 6:
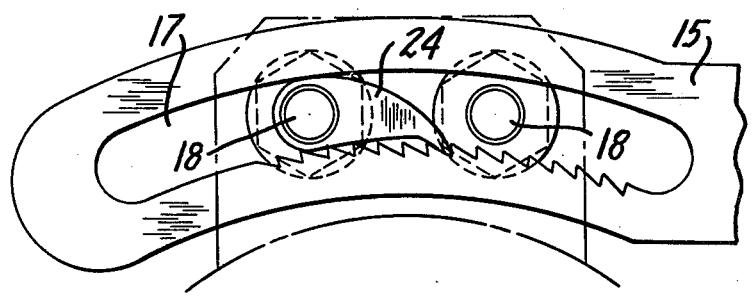
FIG. 6 shows a partial detailed view of another embodiment, in which the position of a compressor is adjusted by the use of the click member.

FIG. 6 shows a locking member in the form of a click member 24 which is turned around the bolt 18 provided inside the elliptic hole 17.

Figure 7:
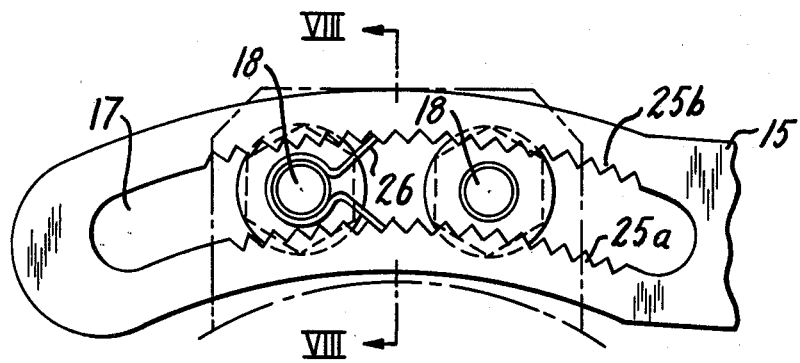
FIGS. 7-10 show front views and side views of another embodiment, in which the position of the compressor is adjusted by the use of a plate spring.
Figure 8:
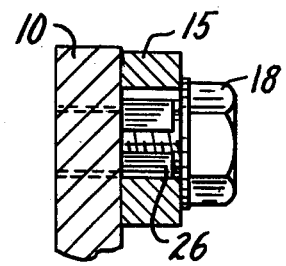

FIGS. 7 and 8 show another embodiment of this invention in which triangular tooth surfaces 25a, 25b are provided at both the upper and lower inner peripheral surfaces of the elliptic hole 17. A locking member in the form of a plate spring 26 of Ω shape is fixed to at least one of the bolt 18 and engages with the tooth surfaces 25a and 25b.

Figure 9:
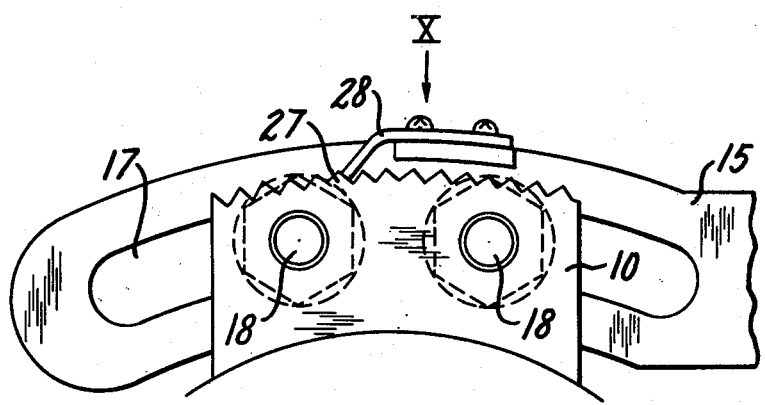
Figure 10:
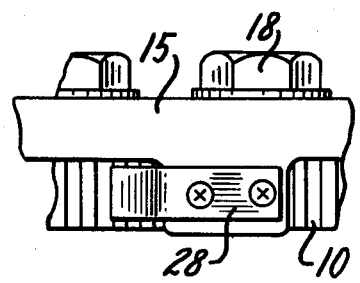

FIGS. 9 and 10 show another embodiment of this invention in which a triangular tooth surface 27 is provided at an upper end surface of the fixed plate 10, and a plate spring 28 of substantially "<" shape is fixed to the upper side surface of the mount stay member 15 and engages with the tooth surface 27. In each embodiment, the elliptic hole may be provided on either the fixed plate 10 or the mount stay member 15 since the relationship between the elliptic hole 17 and the bolts 18, 18 is relative.

Figure 11:
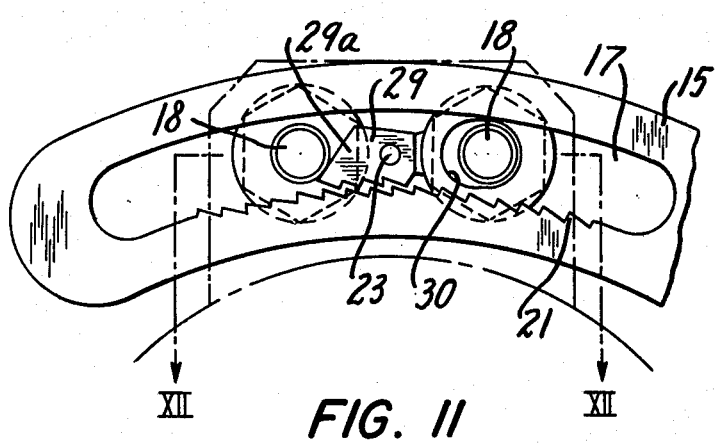
FIGS. 11-12 show a front view and a side view of another embodiment, in which the stopper member also functions as the washer.
Figure 12:
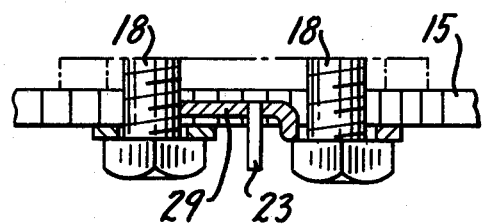

FIGS. 11 and 12 show another embodiment of the present invention, in which the saw-tooth surface 21 is provided at the inner peripheral surface of the elliptic hole 17 formed on the mount stay member 15. The toothed surface 21 engages with a corresponding toothed surface of a locking member in the form of a stopper member 29 positioned inside the elliptic hole 17 between the bolts 18 and 18 to adjust the position of the fixed plate 10. One end of the stopper member 29 may be straight, but it is preferable that one end thereof be provided with a sloped surface 29a. Namely, the release of the engagement between the tooth surface 21 and the stopper member 29 may be prevented by pushing down the stopper member 29 by the bolt 18 which is in contact with the sloped surface 29a, whereby the fixed plate 10 is surely fixed. The other end of the stopper member 29 is formed in one body with the bolt 18 to also function as the washer thereof. The stopper member 29 is provided with an elliptic hole 30 to release the engagement of the two toothed surfaces, and the pin 23 projects between the head portions of the bolts 18, 18 to be operated easily.

FIGS. 13 and 14 show another embodiment of this invention in which the saw-tooth surface 21 is provided at the lower inner peripheral surface of the elliptic hole 17 formed on the mount stay member 15. The toothed surface 21 engages with a locking member in the form of a stopper member 31 positioned between the bolts 18 and 18 inside the elliptic hole 17 to position the fixed plate 10. The stopper member 31 is provided with a saw-tooth surface which are engageable with the saw-tooth surface 21 of the mount stay member 15 at substantially the center thereof, and both ends of the stopper member 31 are elongated laterally to function as the washers of the bolts 18 and 18. Both through holes at both the ends of the stopper member are elliptic holes 32a and 32b, and the stopper member 31 is provided with the pin 23 which projects between to the head portions of the bolts 18, 18 at the center thereof to easily release the engagement between the toothed surface 21 and the toothed stopper member 31. The engaging force can be strengthened by inserting the elastic member such as a plate spring (not shown) between the upper inner periphery of the elliptic hole 17 and the stopper member 31 as necessary.

FIGS. 15 to 17 show another embodiment of this invention. In the drawings, reference numeral 44 denotes a locking member in the form of a stopper member provided at the side portion of the mount stay member 15 and formed substantially in the shape of a crank. The stopper member 44 is provided with a toothed surface 45 for engaging with the toothed surface 21 at the lower end thereof as shown in FIGS. 15 and 17. The bolts 18, 18 are inserted into the elliptic holes 46, 46 at both ends of the stopper member 44, whereby the stopper member 44 is supported to be pivoted with the fixed plate 10 against the mount stay member 15. The center lines of the elliptic holes 46, 46 on the stopper member 44 in the lengthwise direction inclines relative to the pivotal direction of the compressor, i.e. the elliptic holes 46, 46 are inclined by themselves relative to the center line of the elliptic hole 17 in the lengthwise direction on the mount stay member 15 at fixed angles (20°–40°). When tension is applied to the V-belt 4, the pushing pressure of the bolt 18 is applied to the stopper member 44 in the lower direction, so that the toothed surface 45 of the stopper member 44 firmly engages with the toothed surface 21 of the mount stay member 15. The stopper member 44 also functions as the washer interposed between the mount stay member 15 and the bolt 18.

As illustrated in detail, in the mounting mechanism for a compressor for a car cooler according to the invention, the distance between the pulley on the engine and the pulley on the compressor is easily adjusted and an appropriate tension can be applied to the V-belt without using a tension pulley, whereby the space occupied by the compressor is extensively reduced, and an appropriate tension can be applied to the V-belt for the compressor independently of the generator and the other components which are likewise driven by engine.

Further, the stopper member which engages with the toothed surface of the elliptic hole is supported by the bolts to adjust the pivoting position of the compressor, and the hole to provide the stopper member therein is elliptic and inclined with respect to the pivotal direction of the compressor at the predetermined angle. Accordingly the position of the compressor is held only by the tension of the belt without using particular elastic member, since both of the toothed surfaces engaged each other.

The bolts function also as the member to support the stopper member, and the stopper member functions as the washer, and the stopper member is made in one body with the toothed portion for positioning the compressor, whereby the number of parts can be reduded in comparison with the conventional type.

Since the position of the compressor is held by the pressure contact between the elliptic holes and the bolts, the position is released only by pivoting the compressor. As a result, the tension of the belt of the adjustment of the compressor is remarkably simplified within the limited space of the engine compartment.

We claim:

1. A mounting mechanism for a compressor for a car cooler for mounting the compressor in a car engine compartment comprising: fixed plates projecting from an outer periphery of the compressor; at least two mount stay members fixed inside the engine compartment and spaced at substantially the same distance as the outer periphery of the compressor and fixed to respective ones of the fixed plates by bolts extending in parallel with a driving shaft of the compressor to define mount stay member and fixed plate pairs; an elliptic hole formed in the mount stay member of one pair to enable the position of the compressor to be adjusted by pivoting the compressor around the bolt which fixes another mount stay member and fixed plate pair, said elliptic hole having a toothed surface at the inner peripheral surface thereof, a stopper member mounted on the fixed plate of said one pair and engageable with the toothed surface to determine the relative position of the mount stay member and the fixed plate of said one pair, and said elliptic hole being inclined at a predetermined angle relative to the pivotal direction of the compressor.

2. A mounting mechanism for a compressor for a car cooler for mounting the compressor in a car engine compartment comprising: fixed plates projecting from an outer periphery of the compressor; at least two mount stay members fixed inside the engine compartment and spaced at substantially the same distance as the outer periphery of the compressor and fixed to respective ones of the fixed plates by bolts extending in parallel with a driving shaft of the compressor to define mount stay member and fixed plate pairs; an elliptic hole formed in the mount stay member of one pair to enable the position of the compressor to be adjusted by pivoting the compressor around the bolt which fixes another mount stay member and fixed plate pair, said elliptic hole having a toothed surface at the inner peripheral surface thereof, a stopper member mounted on the fixed plate of said one pair and engageable with the toothed surface to determine the relative position of the mount stay member and the fixed plate of said one pair, the stopper member having a sloped surface inclined at a predetermined angle relative to the pivotal direction of the compressor at the side surface thereof, and said sloped surface having a pin extending parallel to the axial direction of the bolt at the surface thereof.

3. A mounting mechanism for a compressor for a car cooler for mounting the compressor in a car engine compartment comprising: fixed plates projecting from an outer periphery of the compressor; at least two mount stay members fixed inside the engine compartment and spaced at substantially the same distance as the outer periphery of the compressor and fixed to respective ones of the fixed plates by bolts extending in parallel with a driving shaft of the compressor to define mount stay member and fixed plate pairs; an elliptic hole formed in the mount stay member of one pair to enable the position of the compressor to be adjusted by pivoting the compressor around the bolt which fixes another mount stay member and fixed plate pair, said elliptic hole having a toothed surface at the inner peripheral surface thereof, a stopper member mounted on the fixed plate of said one pair and engageable with the toothed surface to determine the relative position of the mount stay member and the fixed plate of said one pair, said stopper member being disposed at the periphery of one of the bolts, and the end of the stopper member comprising a spring member in contact with the toothed surface.

4. A mounting mechanism for a compressor for a car cooler for mounting the compressor in a car engine compartment comprising: fixed plates projecting from an outer periphery of the compressor; at least two mount stay members fixed inside the engine compartment and spaced at substantially the same distance as the outer periphery of the compressor and fixed to respective ones of the fixed plates by bolts extending in parallel with a driving shaft of the compressor to define mount stay member and fixed plate pairs; an elliptic hole formed in the mount stay member of one pair to enable the position of the compressor to be adjusted by pivoting the compressor around the bolt which fixes another mount stay member and fixed plate pair, said elliptic hole having a toothed surface at the inner peripheral surface thereof, a stopper member mounted on the fixed plate of said one pair and engageable with the toothed surface to determine the relative position of the mount stay member and the fixed plate of said one pair, wherein at least two bolts fix the fixed plate to the mount stay member at the region of the elliptic hole, the stopper member having a pair of elliptic throughholes into which extend the two bolts and having a toothed surface for engaging with the toothed surface of the elliptic hole.

5. A mounting mechanism for a compressor for a car cooler for mounting the compressor in a car engine compartment comprising: fixed plates projecting from an outer periphery of the compressor; at least two mount stay members fixed inside the engine compartment and spaced at substantially the same distance as the outer periphery of the compressor and fixed to respective ones of the fixed plates by bolts extending in parallel with a driving shaft of the compressor to define mount stay member and fixed plate pairs; an elliptic hole formed in the mount stay member of one pair to enable the position of the compressor to be adjusted by pivoting the compressor around the bolt which fixes another mount stay member and fixed plate pair, said elliptic hole having a toothed surface at the inner peripheral surface thereof, a stopper member mounted on the fixed plate of said one pair and engageable with the toothed surface to determine the relative position of the mount stay member and the fixed plate of said one pair, wherein at least two bolts fix the fixed plate to the mount stay member at the region of the elliptic hole, the stopper member having an elliptic throughhole into which extends one of the bolts and having a toothed surface for engaging with the toothed surface of the elliptic hole and having a sloped surface inclined at a predetermined angle relative to the pivotal direction of the compressor.

6. A mounting mechanism for mounting a compressor in an engine compartment of a car comprising: at least two plate members fixed to and projecting outwardly from the compressor at circumferentially spaced locations thereof; at least two mount members fixedly securable in an engine compartment during use of the mounting mechanism and dimensioned so as to extend in superposed overlying relationship with respective ones of the plate members; means including a bolt extending through at least one pair of superposed plate and mount members for pivotally mounting the compressor to undergo pivotal movement about the bolt to thereby enable adjustment of the position of the compressor; and locking means coacting with at least one other pair of superposed plate and mount members for releasably locking the compressor in its adjusted position, said locking means comprising an elongate slot formed in one of the two plate and mount members, means defining a toothed surface along an inner surface of the slot, and a locking member connected to the other of the two plate and mount members and disposed within the slot so as to engage with the toothed surface of the slot to releasably lock together the other pair of plate and mount members thereby locking the compressor in its adjusted position.

7. A mounting mechanism according to claim 6; wherein the locking member has a toothed surface engageable with the toothed surface of the slot.

8. A mounting mechanism according to claim 6; wherein the locking member comprises a turnably mounted click member engageable with the toothed surface of the slot.

9. A mounting mechanism according to claim 6; wherein the locking member comprises a spring member resiliently engageable with the toothed surface of the slot.

10. A mounting mechanism according to claim 6; wherein the locking means includes a bolt extending through the other pair of plate and mount members and extending into the slot, the locking member being connected to the bolt.

11. A mounting mechanism according to claim 10; wherein the locking member comprises a click member turnably mounted on the bolt for engaging with the toothed surface of the slot.

12. A mounting mechanism according to claim 10; wherein the locking member comprises a spring member mounted on the bolt for engaging with the toothed surface of the slot.

* * * * *